United States Patent [19]

Illetschko

[11] Patent Number: 4,539,594
[45] Date of Patent: Sep. 3, 1985

[54] SYSTEM FOR REDUCING NOISE IN A TELEVISION SIGNAL

[75] Inventor: Gerhard Illetschko, Darmstadt, Fed. Rep. of Germany

[73] Assignee: Robert Bosch GmbH, Stuttgart, Fed. Rep. of Germany

[21] Appl. No.: 582,929

[22] Filed: Feb. 23, 1984

[30] Foreign Application Priority Data

Mar. 4, 1983 [DE] Fed. Rep. of Germany ....... 3307687

[51] Int. Cl.³ .......................... H04N 5/21; H04N 5/14
[52] U.S. Cl. ..................................... 358/167; 358/166; 358/36
[58] Field of Search ........................... 358/166, 167, 36

[56] References Cited
U.S. PATENT DOCUMENTS 4,242,704 12/1980 Ito et al. .............................. 358/167
4,296,436 10/1981 Achiha ............................... 358/167
4,485,403 11/1984 Illetschko ........................... 358/167

Primary Examiner—John C. Martin
Assistant Examiner—E. Anne Toth
Attorney, Agent, or Firm—Frishauf, Holtz, Goodman & Woodward

[57] ABSTRACT

The amount of noise reduction of a television signal produced by averaging corresponding pixels from one frame to the next is reduced by a correction factor when motion in the picture is detected. In order to prevent very active motion from disturbing detection of the noise level, a noise level measurement signal is subjected to a hold of its value in a time briefly preceding a highly active motion in the picture until a time shortly after the end of such highly active motion. The motion signal is processed so as to provide such a hold only when motion is highly active in the picture, and that signal is prolonged in a further circuit so that it will have a duration long enough to cover build-up of that motion and its trailing off, when the noise measurement signal is delayed by about half of the prolongation, so that the noise measurement level that is held corresponds to the noise level prior to the buildup of the motion which shortly thereafter becomes highly active. The noise value thus held controls the size of the correction factor (k) produced by the presence of the motion signal.

5 Claims, 1 Drawing Figure

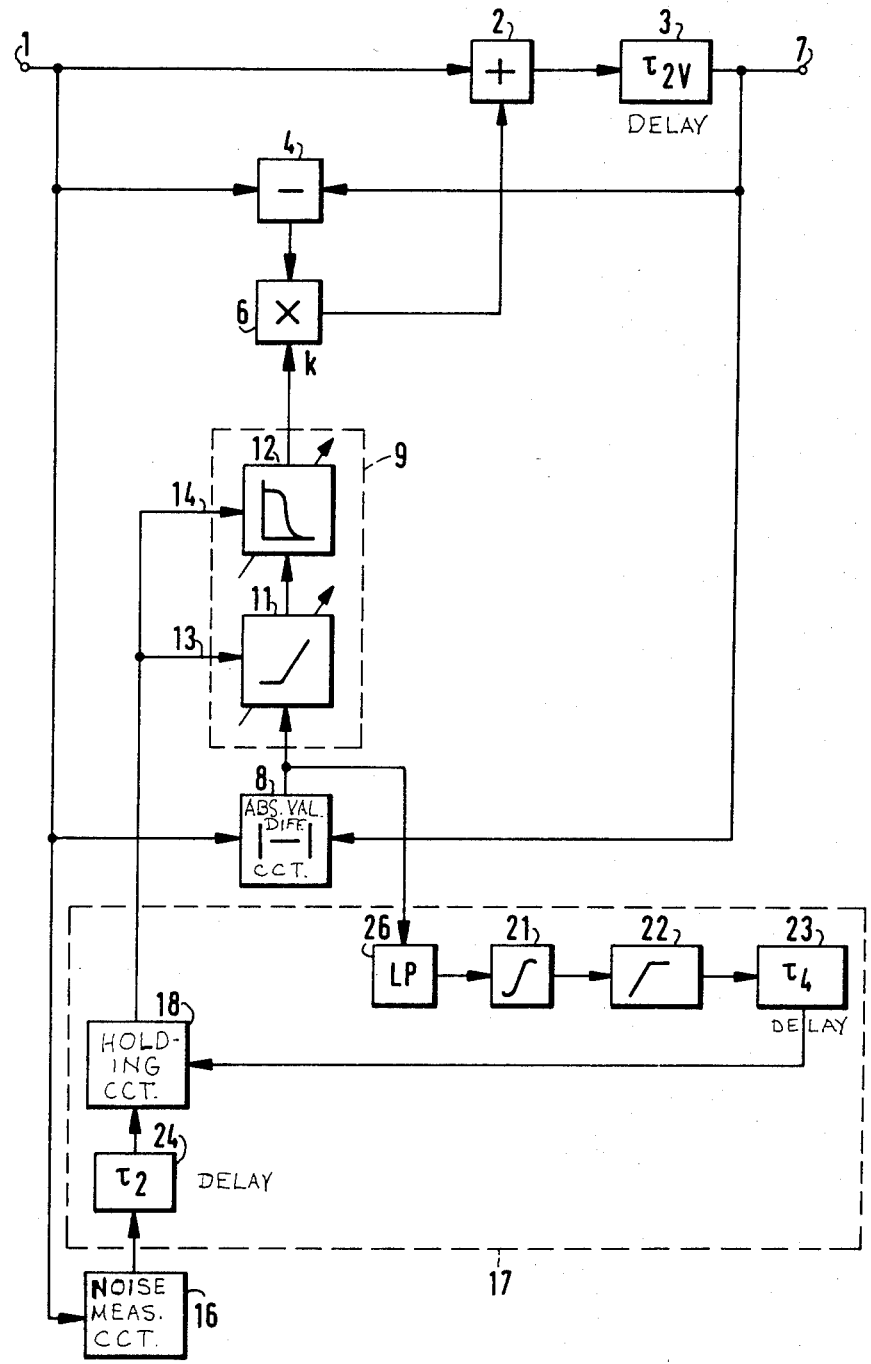

SYSTEM FOR REDUCING NOISE IN A TELEVISION SIGNAL

The invention concerns a system for noise reduction in a television system with provision for preventing the noise reduction operation from reducing the sharpness of moving parts of the television picture.

Systems for television noise reduction have already become known in which a television signal is delayed for one frame period and then added to the undelayed signal after being weighted with a correction factor. The operation of this known system is based on the principle that differences from one television frame to the next are averaged. This averaging produces not only the desired noise reduction but also a reduction of sharpness of movement. It is, therefore, necessary to turn down the effect of the averaging in the case of movement in the picture. Means are therefore to be provided which make possible distinguishing differencecs between successive pictures which result from noise and those which result from movement.

It is known from U.S. Pat. No. 4,058,836 to produce the difference between the undelayed and the delayed television signal and to lead the result through a threshold value circuit. This procedure is based on the principle that noise in a televison signal is relatively slight, whereas in the case of movement greater differences occur between one frame and the next, which produce a signal that passes through the threshold circuit and controls the noise reduction system in such a way that its effect is reduced. These systems have the disadvantage that movements in scenes of low contrast are not taken account of and, accordingly, are subjected to the reduction process along with the noise. As a result moving edges appear fuzzy.

In another known system described in German published patent application (OS) No. 29 37 284 operation is based on the fact that small picture details cannot be perceived by the human eye when the picture is in motion. A lowpass filter modifies the movement-responsive signal in the horizontal direction and/or the vertical direction, and suppresses the coresopnding noise components in the movement signal. This system has the disadvantage that in the case of relatively light low-pass filtering noise peaks have an effect on the amount of the noise suppression because they are recognized as movement. Noise reduction is in this case controlled by noise itself and produces in the picture a coarse-grained structure disturbance which sometimes is more annoying than the original noise. In the case of heavier low-pass filtering, the details of movement are suppressed and a loss of sharpness in moving picture portions becomes visible.

In another system described in published German patent application (OS) No. 31 21 597, likewise equipped with a television frame store and a movement detector, the previously described disadvantages are dealt with by leading the signal representing movement through a low-pass filter and/or a threshold circuit both of which are controllable, the former with regard to the cutoff frequency and the latter with respect to the value of the threshold. The result is thereby obtained that in the case of smaller noise amplitude in the input signal no disturbing losses of sharpness of movement take place, whereas, when there is a larger noise amplitude, reflexive control of noise reduction by the noise itself it prevented. In the case of the active movements in the picture signal the measurements of input noise in the system just described produce false results, however.

SUMMARY OF THE INVENTION

It is an object of the present invention to provide a system for television noise reduction in which false judgement of the level of the input noise during active movement in the television picture can be suppressed or prevented.

Briefly, a hold-control signal is derived from the picture motion signal and holding circuit means are interposed between the noise measuring means and the control inputs of the circuits that modify the movement signal for deriving the correction factor signal so that for a period controlled by the hold-control signal the last value of noise measurement level will be used to control the circuits modifying the motion signal for the provision of a correction factor signal.

The system of the invention has the advantage that even when there is active movement in the picture the adjustments based on the noise in the input signal are maintained so that a good noise reduction without deterioration of motion is obtained. There is a further advantage that the running in of the measurement curcuit for the noise after falling off of the movement signal remains invisible.

It is particularly advantageous in the apparatus of the invention for the movement signal to be processed not only by an integrating circuit and a threshold circuit but also by a signal-prolonging circuit and for a delay circuit to be provided between the noise level measurement circuit and the holding circuit, so that a noise measurement signal at a time somewhat preceding occurrence of active movement is usable for the control signal for the connection factor not only during the movement, but somewhat before it and somewhat after it, which is to say during the build up of the movement and its quieting down.

BRIEF DESCRIPTION OF THE DRAWING

The invention is further described by way of illustrative example with reference to the annexed drawing, the single FIGURE of which is a circuit block diagram of an embodiment of the system according to the invention.

DESCRIPTION OF THE ILLUSTRATED EMBODIMENT

The television signal of which the noise component should be reduced is provided at the terminal 1 in the drawing. The signal proceeds through the addition circuit 2 over to a delay unit 3 which delays the television signal by the period of a television frame ($\tau_{2V}$). Such delay units are very well known and are advantageously provided in the form of a digital full frame store, of which the contents are read out after a full frame has been written in. The delayed signal provided at the output of the delay unit 3 is supplied to a subtraction circuit 4 by which the undelayed signal present at the terminal 1 is subtracted from the delayed signal. The output of the subtraction circuit 4 is provided to a multiplier circuit 6 and the output of the latter is provided to the addition circuit 2 which has already been mentioned. Thus the combination of the circuits 2, 3, 4 and 6 constitute a so-called recursive filter which averages signal amplitudes that do not come back at exactly the same value from frame to frame, and thus reduces differences in those cases.

The factor k supplied to the multiplier circuit 6 determines the degree or extent of the averaging described above. The more the factor k approaches the value 1, the stronger is the effect of the recursive filter, and therefore the greater is the time over which the integration (averaging) takes place. The television signal with reduced noise can be taken off from the terminal 7. In the case of immobile pictures a practically unlimited noise reduction is possible, if sufficiently long integration takes place.

In the case of pictures incorporating motion, the integration still leads to fuzzy edges so that the effect is to be reduced whenever movements appear in the picture. For this purpose a so-called motion detector 8 is provided to which the television signals present respectively at the terminals 1 and 7 are supplied. The output of the motion detector 8 is connected to the input of a circuit 9 having a controllable transfer characteristic for generating the correction factor k.

The motion detector 8 consists essentially of a difference-forming circuit by which the difference between the undelayed signal and the signal delayed by a frame interval is produced. Since the effect on noise reduction should be independent of the sign of the change of picture content, the absolute value of the difference is produced by the motion detector 8 (the difference value is given always with the same sign or polarity). According to the size of the change from one frame to the next, the correction factor k for the degree of noise reduction is produced in the circuit 9.

Since, in addition to motion, noise also leads to an output signal of the detector 8, and should not be admitted to the control of the integration process, a threshold value circuit 11 and a low-pass circuit 12 are connected to follow the output of the detector 8. The threshold value circuit and the low-pass filter 12 are controlled by a control voltage which is provided to their respective control terminals 13 and 14. This control voltage corresponds to the average amplitude of the noise contained in the input signal and is derived from the noise measuring circuit 16.

If the noise in the input signal is relatively small, the output signal of the detector 8 is little affected by the circuit 11 and the low-pass filter 12, which means that the threshold of the threshold value circuit 11 is low and the cut-off frequency of the low-pass filter 12 is high, for example 2.5 mHz. In this condition of operation noise is reduced without introducing a visible impairment of picture sharpness in the case of a normal amount of picture movement.

If highly active picture movements occur, however, then the output of the noise measuring circuit 16 will be affected by such movement. Strong picture movement is evaluated as heavy noise and in consequence the cut-off frequency of the low-pass filter 12 must be reduced and the threshold of the threshold circuit 11 raised. In this case also, therefore, the desired improved margin against disturbance is maintained: in the case of most movements, however, there would be a loss of resolution of high-frequency signal components and a lack of sharpness in scenes having low contrast unless further measures were taken.

The disadvantage just described is avoided in the case of the present invention by interposition of a control circuit 17 dependent upon the movement signal, between the noise measurement circuit 16 and the inputs 13 and 14.

The control circuit 17 consists essentially of a holding cirucit 18 that is dependent upon the movement signal for control. The holding circuit 18 controlled by a signal which is produced at the output of the detector 8 and is processed by an integration or summing circuit 21 for summing the movement signal, for example, over the period of some fraction of a frame, then further processed by a movement threshold circuit 22. When the integrated signal exceeds a predetermined movement threshold, a holdcontrol signal is passed to the holding circuit 18, as a result of which the particular value of the noise measurement that at that moment is present is held and, for a certain holding period, is supplied for control of the circuits 11 and 12. The holding period lasts as long as the hold-control signal remains at the control input of the holding circuit 18. Before the threshold of the motion threshold circuit 22 is exceeded and after the motion signal has ceased to exceed that threshold, there are respectively a period in which the picture motion builds up and a period in which the picture motion quiets down. These preliminary and trailing phases of motion, on the average, last for a few frames of the television picture and can now be taken account of by having the hold-control signal prolonged, so that it lasts over the sum of the duration of both of these phases as well as the active motion duration, This is done by a signal prolonging circuit 23 which may prolong or extend the hold-control signal, for example, by four frame periods. The output of the noise measurement must then be subjected to delay corresponding to the building up of the movement by means of a delay circuit 24 connected to the output of the noise measurement circuit for delaying the signal of the latter, for example, for two frame period in order to be able to supply to the holding circuit 18 the undisturbed measurement value.

In order to reduce the noise components in the motion signal, a low-pass filter 26 can also be provided between the detector 8 and the summing or integrating circuit 11.

Although the invention has been described with reference to a particular illustrative embodiment, it will be appreciated that variations and modifications are also possible within the inventive concept.

I claim:

1. Apparatus for reducing noise in a television system including:

means (3) for delaying a television signal by one television frame interval;

means (8) for generating a signal representative of the absolute value of the difference between corresponding portions respectively of said television signals and of the output of said delaying means (3) to produce a picture motion signal;

controllable transfer-characteristic transmission means (11,12) having at least one control input for converting said picture motion signal into a correction factor signal;

means for measuring the noise in said television signal (16) and for deriving a noise amplitude signal therefrom and applying it to control said controllable transfer-characteristic transmission means, said signal deriving means (17) comprising:

means (26, 21, 22, 23) for deriving a hold-control signal from said picture motion signal, and holding circuit means (18) interposed between said noise measuring means (16) and said at least one control input of said controllable transfer-characteristic means (11,12) for providing to the latter, during the presence of each said hold-control signal the last held value of the output of said noise measuring means preceding the appearance of said hold-control signal.

2. Apparatus according to claim 1 in which said signal deriving means includes an integrating circuit (21) and a threshold value circuit (22) connected in cascade, through which said picture motion signal is caused to pass.

3. Apparatus according to claim 2 in which said signal deriving means also includes a signal-prolonging circuit (23) following said threshold value circuit (22), and in which a delay circuit (24) is interposed between said noise measuring means (16) and said holding circuit means (18).

4. Apparatus according to claim 3 in which a low-pass filter (26) is connected in cascade with said integrating circuit (21) and said threshold value circuit (22).

5. Apparatus according to claim 4 in which said integrating circuit follows said low-pass filter and said threshold value circuit follows said integrating circuit.

* * * * *